March 24, 1925.
G. E. MASSIN
1,531,206
HEADLIGHT FOR MOTOR VEHICLES
Filed June 24, 1924
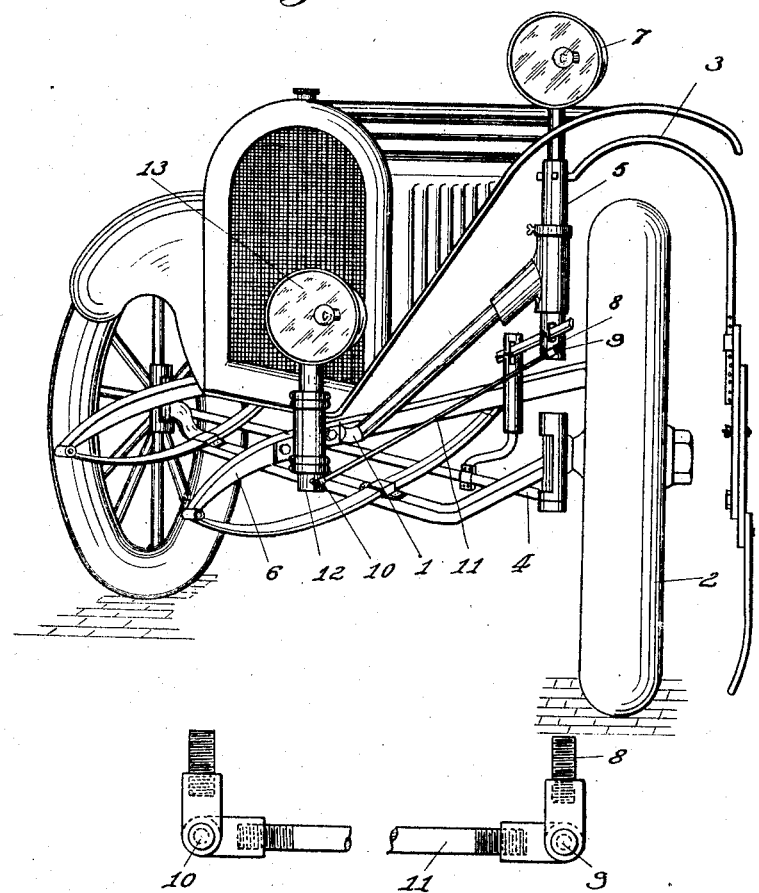
INVENTOR:
GEORGES EMILE MASSIN Patented Mar. 24, 1925.

1,531,206

UNITED STATES PATENT OFFICE.

GEORGES EMILE MASSIN, OF BRUSSELS, BELGIUM.

HEADLIGHT FOR MOTOR VEHICLES.

Application filed June 24, 1924. Serial No. 722,140.

*To all whom it may concern:*

Be it known that I, GEORGES EMILE MASSIN, a citizen of the French Republic, and resident of Brussels, Belgium, have invented certain new and useful Improvements in Headlights for Motor Vehicles, of which the following is a specification.

My present invention relates to head-lights for motor-vehicles and has for its object to make such head-lights rotatable in their supporting bearings in such a way that they will always be directed in the same direction as the front vehicle wheels. In other words the object of my present invention is to impart the same movement to the head-lights and steering wheels (for instance on curves of the road), this result being obtained by imparting movement to the head-lights by means of a member taking part in the movements of the connecting rod or lever of the steering device.

More particularly my invention refers to the production of such rotations of the head-lights by utilizing the bracket of the mud-catcher described in another application filed together with my present application.

In the drawings, Fig. 1 is a broken perspective view illustrating the present improvements in head lights; and Fig. 2 is a plan view showing the mounting connection forming part of the invention.

As already described in my other application, the vertical rod 5 arranged in the plane of the vertical diameter of the wheel 2, carries the rod 3 of the mud-catcher and the connecting rod 4 of the steering device imparts the same rocking movement to said rod and wheel 2 or the axle-journal thereof. The fastening flange 1 of the bracket of the mud-catcher to the longitudinal bar 6 of the chassis frame is—in the example illustrated—bolted to the two holes generally provided for the head-light, but of course said flange may also be secured to any other point of the longitudinal bar.

The most simple embodiment of the invention consists in fitting the rod of the head-light 7 into the top part of the rod 5, whereby said head-light will become integral with said rod 5 and be moved together with the same. However this way of mounting the head-light is only practical if the axle-journals of the front wheels are located near the front end of the chassis frame.

Another method of mounting applicable to any type of vehicle consists in providing a screw-threaded hole in the bottom part of the rod 5, in which hole a screw 8 will be threaded. Screwed onto the outer end of said screw 8 is the end of a double eye 9, the second also screw-threaded branch of which is connected to a second double eye 10 by means of rigid rod 11 which is extensible or not. Said second double eye 10 is connected in a similar way to any appropriate or available part of the rod 12 of the head light 13, the connection being here shown below the lower locking nut on such rod 12. By the arrangement of said two double-eyes and screws I obtain a double pivotal connection whereby the rotary movements of the rod 5 will be transmitted exactly to the supporting bracket 12 of the head-light.

Having now fully described my said invention, what I claim and desire to secure by Letters Patent, is:

1. The combination with a head-light of a motor-vehicle and the supporting rod thereof, of a movable mud-catcher, a vertical rotatable rod carrying said mud-catcher, means whereby said rotatable rod will be rocked in unison with the steering-wheels, and means for operatively connecting the supporting rod of the head-light to said rotatable vertical rod, substantially as set forth.

2. The combination with a head-light of a motor-vehicle, the supporting rod thereof and a laterally projecting screw fitted into the end of said supporting rod, of a vertical rotatable rod, means whereby said vertical rotatable rod will be rocked in unison with the steering wheels, a mud-catcher carried by said rotatable rod, a laterally projecting screw fitted into the lower end of said rotatable rod, an extensible connecting rod connecting both laterally projecting screws whereby the head-light will be rocked in unison with said vertical rotatable rod, substantially as set forth.

In testimony whereof I have hereunto set my hand in presence of two witnesses.

GEORGES EMILE MASSIN.

Witnesses:
 O. CHLOIX,
 EMIL VANNERSSEEH.